Jan. 10, 1956 T. W. MERRITT ET AL 2,730,071
MILKING APPARATUS
Filed June 2, 1951 3 Sheets-Sheet 2
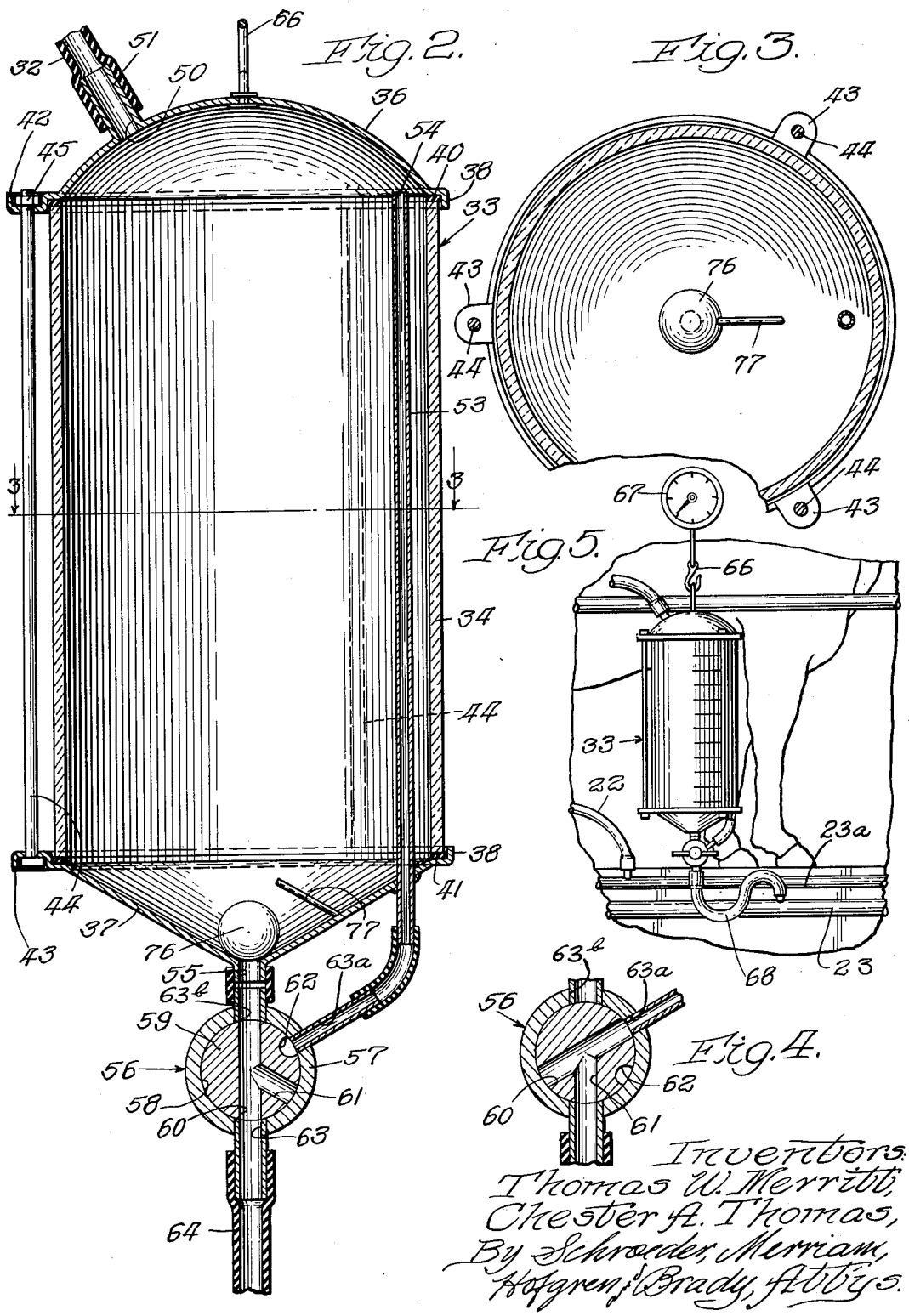
Inventors:
Thomas W. Merritt,
Chester A. Thomas,
By Schroeder, Merriam,
Hofgren & Brady, Attys.

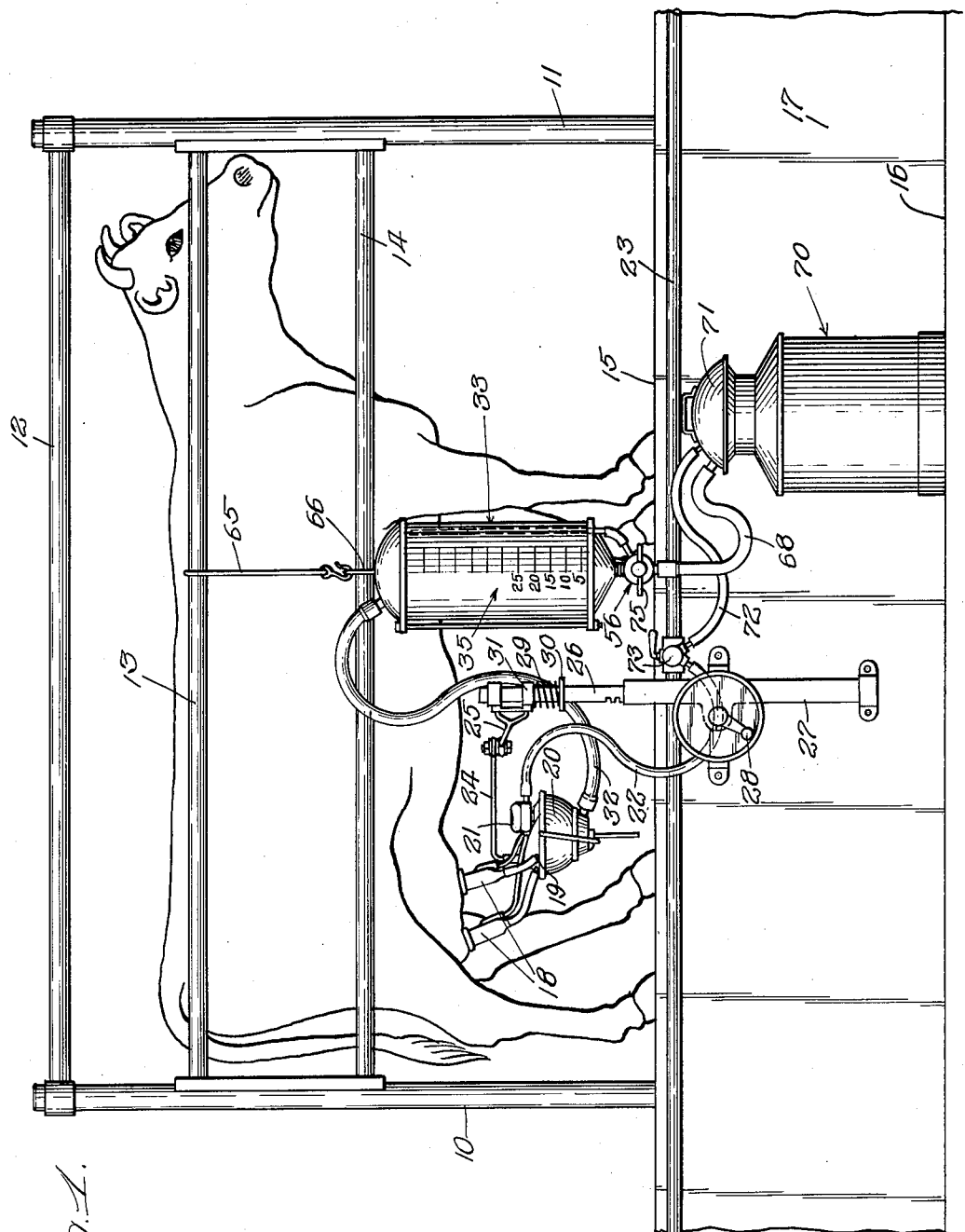

Jan. 10, 1956 T. W. MERRITT ET AL 2,730,071
MILKING APPARATUS
Filed June 2, 1951 3 Sheets-Sheet 3
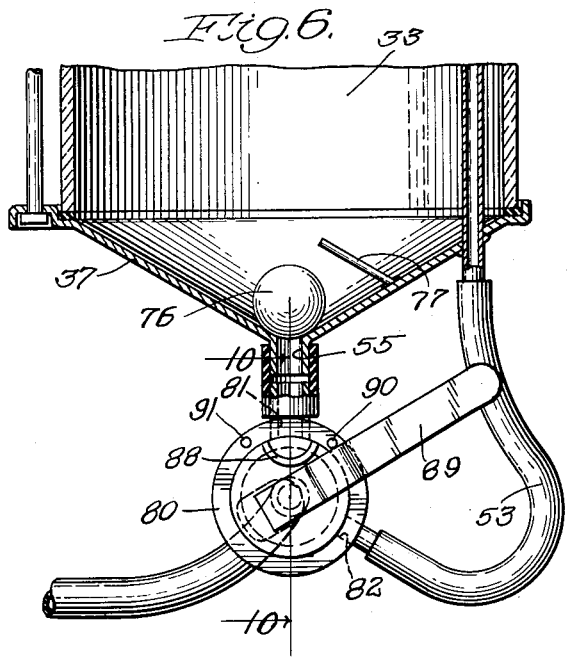
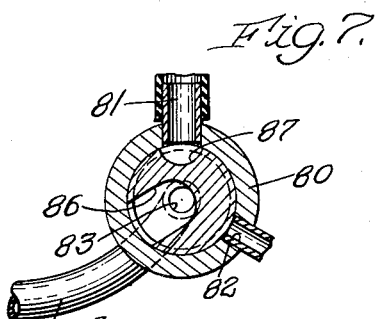
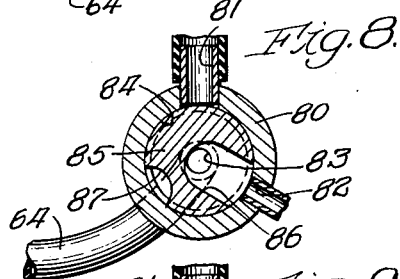
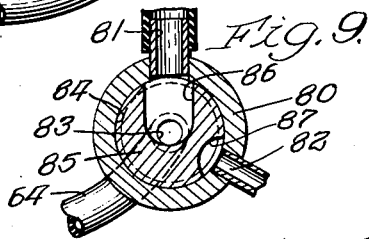
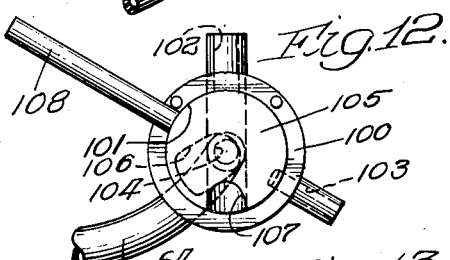
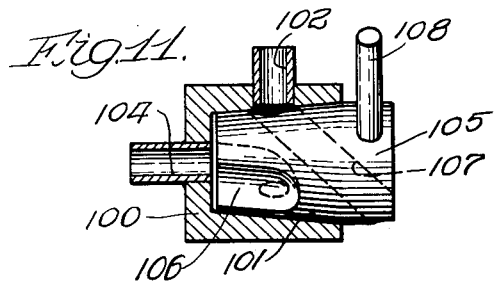
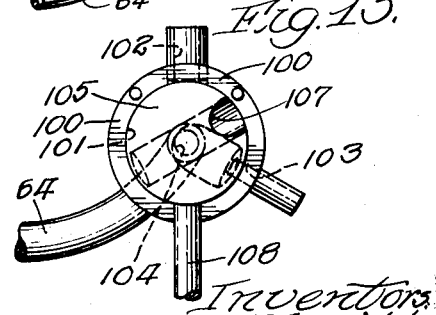
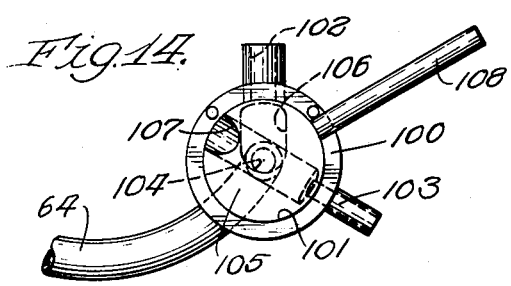
Inventors
Thomas W. Merritt,
Chester A. Thomas,
By Schroeder, Merriam,
Hofgren & Brady, Attys.

United States Patent Office 2,730,071
Patented Jan. 10, 1956

2,730,071

MILKING APPARATUS

Thomas W. Merritt, St. Charles, and Chester A. Thomas, Lake Forest, Ill., assignors to Babson Bros. Co., a corporation of Illinois Application June 2, 1951, Serial No. 229,592

12 Claims. (Cl. 119—14.46)

This invention relates to a milking system, especially for use in milking cows, and more particularly to a milking apparatus which provides for visual inspection and measurement of milk delivered by a cow during the milking operation.

One feature of this invention is that it provides an improved milking apparatus. Another feature of the invention is the provision of a container into which milk from the cow is delivered and temporarily stored, the container being positioned remote from the milk withdrawing apparatus so that the quantity of milk delivered by a cow may readily be ascertained upon the completion of the milking operation. A further feature of the invention is the provision of a container remote from the milk withdrawing apparatus into which all of the milk delivered by the cow is received, the container being made of transparent material and being graduated so that the quantity of milk delivered by the cow can be ascertained by visual inspection and further so that foreign matter in the milk may readily be detected. Another feature of the invention is the provision of a container remote from the milk withdrawing apparatus into which all of the milk delivered by the cow is received and to provide such a container with valve means movable from a first position admitting vacuum to the container to draw milk therein to a second position in which the container is vented and the milk is withdrawn therefrom. A further feature of the invention is the provision of a container into which all milk withdrawn from a cow is delivered with the container being provided with a single valve means movable between two positions in the first of which the container is connected to a source of vacuum to draw milk thereinto and in the second position of which the container is vented to air to allow milk therein to be drawn off and the container emptied. Yet another feature of the invention is the provision of a container into which milk withdrawn from a cow is temporarily delivered and to provide such a container with means for withdrawing milk therefrom by vacuum, together with automatically operated means serving to block off the vacuum line when substantially all the milk is withdrawn from the container. A further feature of the invention is the provision in the container of the type described in the preceding sentence of a ball float for blocking off the vacuum line, together with means for preventing the ball from blocking the vacuum line before substantially all of the milk is withdrawn. A further feature of the invention is the provision of valve means for a container of the type described above which is operable to connect the container to a source of vacuum so that milk may be withdrawn thereinto or to connect the outlet of the container to the source of vacuum to withdraw milk from the container while simultaneously admitting air thereto and which may be operated to connect the bottom of the container to a sampling passage to permit a sample of milk to be withdrawn from the container.

Other and further features will be readily apparent from the following disclosure and drawings, in which:

Fig. 1 is a side elevation of a part of a milking parlor showing a portion of a single stall and the part of the associated milking apparatus embodying the improvements;

Fig. 2 is a sectional vertical view through the milk gathering chamber of the invention;

Fig. 3 is a horizontal section taken along line 3—3 of Fig. 2;

Fig. 4 is a view showing the valve mechanism illustrated at the bottom of Fig. 2 but in a different position;

Fig. 5 is a fragmentary view of the milk chamber portion of Fig. 1 showing a second method of connecting the chamber;

Fig. 6 is a view showing the bottom portion of the container of Fig. 2 and illustrating a modified form of valve device;

Figs. 7, 8 and 9 are sectional views of the valve device of Fig. 6 showing the valve in different positions;

Fig. 10 is a sectional view taken along line 10—10 of Fig. 6;

Fig. 11 is a view like Fig. 10 showing a further modification of the valve device; and Figs. 12, 13 and 14 are views similar to Figs. 7, 8 and 9, but of the modified form of valve shown in Fig. 11.

In the particular embodiment of the invention illustrated here the milking parlor employs the drop system, with the cow floor being at a higher level than the operator's floor or alley. Milking parlors of this general type are more fully described in a number of issued patents and reference may be had, for example, to Babson et al. Reissue 22,368 and Babson 2,477,035 to supplement the present disclosure with respect to the general features of such milking parlors and stalls. In such milking parlors the cows, after any desired preliminary washing of the udder or other preparation, are admitted to a stall, as for example the stall shown in Fig. 1 which includes the vertical uprights 10 and 11, the overhead horizontal bracing member 12 and the side horizontal members 13 and 14. It will be understood that the vertical uprights and horizontal bracing members form a rectangle about the cow therein. The stall illustrated is shown in simplified form without a feed chute, or other operating equipment for convenience and simplicity of illustration.

The cow stands on a floor 15 which would be at some suitable higher level (for example, 2 feet) above an operator's floor or alley 16. A vertical wall 20 extends between the two floor levels.

The milking apparatus in which the present invention is particularly adapted for use and the apparatus herein illustrated and described is of a kind sometimes known in the trade as "carry-away" to distinguish it from a milking machine which receives a given amount of milk directly and which must be emptied between applications to each cow. The system illustrated herein is of a character which can be attached to cows as they move into a stall of a milking parlor and which will deliver milk to a tube or pipe adapted to transport it to any desired point remote from the actual milk withdrawing apparatus or milker. The desired point may be a milk can immediately adjacent the stall or at some remote point or a sanitary pipe line connected to other apparatus found in the milking parlor, such as storage tanks, coolers, pasteurizers or the like. The general character and nature of such a system will only be described here to such an extent as is necessary to enable an understanding of the proper relationship to the remainder of the system of the particular improvement to which this application is directed. Should it be desired to supplement the present disclosure with reference to the milking system in general, reference may be had to Thomas Patent 2,709,416.

In general as may be seen by reference to Fig. 1, the system includes four teat cup assemblies of identical character herein identified as 18. Each such teat cup assembly comprises a rigid outer shell and a flexible inner element called an inflation. This inflation comprises a larger generally cylindrical body adapted to receive the teat being milked and usually comprising an integral short milk tube extending therefrom and forming a part of the milk passageway delivering milk on through various supplemental parts of the passageway to the desired ultimate destination point. Such teat cup assemblies and inflations are well known and have been long used in the field, and it is felt that further description is unnecessary here. The four teat cup assemblies may be connected together in any desired manner to deliver milk to a single flow passageway and the cup assemblies are here shown as having their milk tubes connected to nipples on a lid 19, this lid forming the top of a milk receiving chamber of substantial size, the remainder of the chamber being provided by a bowl shaped element 20. The lid carries, suitably mounted thereon, a pulsator 21 of a well known type conventional in the field to which vacuum is applied by means of a flexible hose connection 22 connected into a common vacuum line 23 which extends alongside of the milking parlor. The entire bowl assembly is supported by an apparatus including a pair of pivotally interconnected arms 24 and 25 supported on a vertical adjustable post 26.

The particular adjustable supporting arrangement is of a type more fully shown and described in Babson et al., Reissue Patent No. 22,368. The post 26 may be vertically adjusted to any desired position by telescopic movement within a tube 27 in turn suitably mounted on the wall 17 and relative movement between the post 26 and tube 27 may be achieved through a rack and gear arrangement operated by the handle 28. A spring 29 encircles the post 26 and has one end bearing against a collar 30 fixed to the post and has its other end bearing against a sleeve member 31 slidable on the rod and supporting the pivotal arm arrangement 24 and 25. Appropriate adjustment of the height of the support provides a downward and forward intermittent tug and pull on the teat during milking with the intermittent effect being due to the pulsator action.

Milk drawn into the bowl 20 is drawn therefrom through a flexible hose connection 32 into a chamber generally designated 33 wherein it is retained until the milking is completed.

As best shown in Figs. 2 and 3, the chamber 33 comprises a cylindrical member 34 preferably made of transparent plastic material and provided with graduations 35. The member 34 is closed at its top by a removable metal domed closure member 36 and at its bottom by a conical closure member 37. Each of the closure members 36 and 37 are provided with turned flanges 38 and 39 respectively about their outer peripheries to form a seat for the ends of the cylindrical member 34 and in which are provided annular resilient sealing members 40 and 41 to provide a fluidtight connection between the end closures and the cylindrical member 34. The upper closure 36 is provided with three outstanding ears or lugs 42 adapted to be aligned with corresponding lugs 43 on the lower closure with all of the lugs being provided with apertures through which rods 44 extend to secure the end closures in place in fluid-tight relationship with the ends of the cylindrical member. Preferably the lower ends of the rods are secured in the lugs 43 while the upper ends are secured to the lugs 42 by the nuts 45 as shown. By loosening the bolts the end closures may be removed and the entire apparatus comprising the chamber may be cleaned with ease.

Formed in the upper closure 36 and communicating with the chamber 33 is a first, or milk receiving passageway 50 provided with a coupling member 51 to which one end of the flexible tube 32 is secured.

The chamber is provided with a second, or suction passageway in the form of a pipe 53 which extends vertically through the lower end closure 37 and is provided with an open end 54 located in the chamber 33 above the highest liquid level in the chamber. It will be understood, of course, that the chamber is designed to have a volumetric capacity of the order of the amount of milk expected to be delivered by any one cow and the second passageway, opening to the chamber near the top thereof, is so constructed that, for an average normal volume of the milk delivered by a cow, its open end 54 will be above the level of milk in the chamber.

The chamber is provided at its bottom with a third, or discharge passageway 55 located at the bottom of the lower end closure 37 and connected to a valve member provided at the bottom of the chamber. The valve member may take several forms and may be provided with means for withdrawing samples of milk from the chamber as will be hereinafter described. As shown in Fig. 2, a valve device 56 is provided for applying vacuum to the chamber to draw milk thereinto or to withdraw milk therefrom.

The valve member 56 shown in detail in Figs. 2 and 4 comprises a cylindrical casing 57 having a cylindrical bore 58 therein in which there is rotatably positioned a core member 59 provided with a first passage 60 extending diametrically therethrough and a branch passage 61 extending from the outer surface of the core member and connected at the center of the core member with the passage 60. The core member is also provided with a vent opening 62 which opens to the atmosphere through the end closures (not shown) of the valve member. The valve member connects by means of a first, or vacuum port 63 to a flexible tube 64 adapted to be connected to a source of vacuum, and connects by means of a second, or suction port 63a with the suction passageway in the chamber, and by means of a third, or milk discharge port 63b with the discharge passageway 55 of the chamber.

The entire chamber 33 including the valve member 56 is suspended in vertical position by the hanging means 65 which is secured to a metal loop 66 fixed to the upper end closure 36, or, if it is desired to weigh the milk delivered, the chamber and attendant apparatus may be suspended from a scale 67 as shown in Fig. 5.

Referring to one mode of employing the apparatus of this invention as illustrated in Fig. 1, the tubing 64 is connected to a milk can 70 through the top or lid 71 thereof, which lid is also connected by means of the flexible tube 72 to the vacuum line 23 through the valve device 73. As shown in this form of installation, the milk is delivered finally to the milk can 70, as desired.

In the particular mode of using the device illustrated in Fig. 5, the chamber 33 is, through the flexible line 64, connected directly into vacuum delivery line 23, so that when the chamber is emptied the milk flows into the line 23 for delivery to pasteurizing tanks, storage tanks and the like. Where the apparatus is used in the mode illustrated in Fig. 5, it is preferable to provide a second vacuum line 23a to which the line 22 to the pulsator is connected in order to maintain at all times the proper vacuum to the milk withdrawing apparatus to guard against contamination in the pulsator line through overflow of the milk. Thus any overflow of milk goes only into the milk line and not into the vacuum pulsator line. With either mode used, the operation of the apparatus of this invention is substantially identical.

In operating the device of this invention, the milk withdrawing apparatus is attached to the cow as illustrated in Fig. 1 and the valve 73 opened to apply vacuum to the pulsator 21 and to the milk can 70. The core member 59 is moved by means of the handle 75 to the position illustrated in Fig. 4. In this position vacuum is applied to the interior of the container through the vacuum port 63 of the valve device, the branch passage 61 and passage 60, suction port 63a and the pipe 53 to draw milk through the milk receiving passageway 50 into the chamber. With the valve so positioned it can be seen that the milk discharge port 63b is blocked so that the milk is retained in the chamber. Upon completion of the milking the operator need only to glance at the scale on the chamber 33 to read off the pounds of milk delivered by the cow and also to inspect for foreign matter, such as dirt, blood and the like, which may have inadvertently become mixed with the milk.

Having completed the inspection the operator then may rotate the handle 75 to move the valve to the position shown in Fig. 2 which connects the discharge passageway 55 and discharge port 63b with the vacuum port 63 through the passage 60 to draw milk from the chamber. It will be noted that with the valve in this position the vent 62 is connected to the suction port 63a and pipe 53 so that air may be admitted to the chamber as the milk is withdrawn.

When milk is drained from the container 33 through the line 66, it is clear that after all the milk has been withdrawn air would then be admitted to the line unless means were provided for blocking off the vacuum line when all or substantially all of the milk has been emptied from the container. It is, of course, undesirable that air be admitted into the vacuum line as such air serves to destroy the vacuum and hence would cause a cessation of milking. In order to avoid the necessity of having an operator standing by each container and valve to shut off the valve as soon as the container is empty, there is provided means which operate automatically when substantially all of the milk is withdrawn to shut off the vacuum. To this end there is provided ball float 76 which normally floats on top of the liquid as it is introduced into the chamber. When substantially all of the milk is withdrawn the ball, which is preferably of soft resilient material such as rubber, seats itself in the opening 55 and seals off the vacuum line from the interior of the container.

Milk, as it is withdrawn from the chamber, has a tendency to vortex and the ball float 76 under such conditions may block off the opening 55 prematurely and thus prevent complete withdrawal of the milk. To prevent the ball from being drawn into the opening through the vortexing action of the milk, a small rod 77 is welded or otherwise secured to the bottom closure member 37 and extends outwardly therefrom above and adjacent the sides of the opening 55. The rod 77 serves to block the ball as it whirls around in the vortex and to prevent it during such vortexing action from seating itself in the opening 55. The rod 77 is sufficiently spaced above the opening as to permit the ball to pass thereunder when substantially all of the milk is withdrawn.

As previously noted, the valving apparatus may take several forms. Referring now to the form illustrated in Figs. 6 to 10 inclusive, the valve comprises a cylindrical casing 80 provided with discharge and suction ports 81 and 82, respectively, about its periphery and a vacuum port 83 which is positioned substantially axially of the casing. A conical bore 84 is formed in the casing in which there is rotatably mounted a core member 85. The core member is provided with a first, or control passage 86 so arranged as to have a portion constantly in communication with the vacuum port 83 and a second portion which opens against the inner face of the bore 84. A second, or vent passage 87 is provided in the core member which opens at one end to the atmosphere at which end there is formed a lip member 88 and opens at its other end to the interior face of the bore. Means in the form of a handle 89 is provided for rotating the core member from the position shown in Fig. 6 in which the handle bears against a stop member 90 to the position illustrated in Fig. 8 until it bears against a second stop member 91.

It will be noted that the discharge port 81 is connected to the third or discharge passageway 55, the suction port 82 is connected to the second, or suction passageway 53 while the vacuum port 83 is connected to the line 64 connected to the source of vacuum.

With the valve in the position illustrated in Figs. 6, 7 and 10 the port 81 is in communication with the vent passage 87 so that milk within the container may be drawn off across the lip 88 and into a cup or the like for sampling of the contents of the chamber 33. In this position communication between the port 82 and the passage 86 is blocked by the inner face of the bore. Rotating the handle to move the valve to the position shown in Fig. 8 connects the vacuum port 83 to the suction port 82 thus connecting the source of vacuum to the suction passageway 53 to draw milk into the container. The discharge port 81 is blocked by the core member and thus the milk is retained within the chamber. Rotating the handle to the position shown in Fig. 9 connects the vacuum port 83 with the discharge port 81 and simultaneously connects the vent passage 87 to the suction port 82. Thus milk within the chamber may be drawn off into the vacuum line 64 and the chamber is vented through the suction port and the suction passageway.

In the embodiment of the valve device illustrated in Figs. 11 to 14 inclusive, the valve is provided with a casing 100 having a bore 101 and a discharge port 102, a suction port 103 and a vacuum port 104 to be secured respectively to the discharge passageway 55, the suction passageway 53 and the vacuum line 64 leading to the source of vacuum. A core member 105 is rotatably mounted in the bore and is provided with a control passage 106 which, like the passage 86 previously described, is constantly in communication with the port 104 at one end while its other end opens against the interior face of the bore. A second, or vent passage 107 extends diagonally through the core member and has one end constantly open to the atmosphere while its other end opens to the interior face of the bore. A handle 108 is provided for rotating the core member from the position shown in Fig. 12 in which one end of the vent passage 107 communicates with the port 102 to permit withdrawal of a sample of milk, to the position shown in Fig. 13 wherein the control passage 106 is connected to the suction port 103 to draw milk into the container, the discharge port 102 being blocked in this position of the valve. The core member 105 may be rotated to the position shown in Fig. 14 which connects the discharge port 102 to the vacuum port 104 and the source of vacuum while simultaneously connecting the suction port 103 to the vent passage 107 so that milk may be withdrawn from the container and the same may be simultaneously vented.

Thus the last two embodiments of the valve device just described not only perform the functions of the valve device 56 previously described in connecting either the second (suction) or third (discharge) passageways to the source of vacuum, but in addition the last two embodiments are provided with means for permitting the withdrawal of a sample of milk for testing and the like. Furthermore, the specific embodiment shown in Figs. 6 to 10, inclusive, is one in which all passages extending through the interior of the core member are eliminated and thus cleaning of the valve and particularly of the core member and its passages is facilitated. In all cases, the core member is made readily removable from the casing of the valve so as to render all parts accessible for cleaning and sterilization.

We claim:

1. Temporary milk storage apparatus for use in a milking system having vacuum means which communicates with milk withdrawing means through said apparatus, comprising a chamber having a volumetric capacity no less than the amount of milk delivered by a cow at a milking, said chamber comprising a body portion having a straight, cylindrical sidewall of transparent material, top and bottom sections in readily separable fluid tight engagement with the ends of the body portion; means defining a milk receiving passageway opening into said chamber and connecting it to said milk withdrawing means; means defining a suction passageway opening through the bottom section of the chamber and extending up to and terminating near the top thereof and above the level of the normal amount of milk to be received in said chamber in milking a cow; means defining a mlik discharge passageway opening into the bottom section of said chamber at the bottom thereof; and valve means which is selectively movable between two positions for controlling the flow of milk into and out of said chamber, said valve means being adapted to provide direct communication between the discharge passageway and the source of vacuum and between the suction passageway and atmosphere in one of said positions and to provide communication between the suction passageway and the source of vacuum and to close off the discharge passageway in the other of said positions.

2. Temporary milk storage apparatus for use in a milking system having vacuum means which communicates with milk withdrawing means through said apparatus, comprising: a chamber having a volumetric capacity no less than the amount of milk delivered by a cow at a milking, said chamber comprising a body portion having a straight, cylindrical sidewall and top and bottom sections in readily separable fluid tight engagement with the ends of said sidewall, and said chamber having means defining a milk receiving passageway connecting it with the milk withdrawing means, means defining a suction passageway above the top level of milk in the chamber, and means defining a milk discharge passageway in its bottom section; and single valve means for controlling flow of milk in and out of said chamber, said valve means including a hollow casing having a suction port and a discharge port connected respectively to the suction and discharge passageways and a vacuum port connected to the source of vacuum, and a control member selectively movable in the casing between a chamber filling position in which it provides communication between the vacuum port and the suction port and a chamber draining position in which it provides direct communication between the vacuum port and the discharge port, said control member having a venting port which port vents the suction port to the atmosphere in chamber draining position.

3. Apparatus of the character claimed in claim 2, wherein the body portion of the chamber is of transparent plastic.

4. Apparatus of the character claimed in claim 2, including means for determining the weight of milk received in said chamber between valve operations.

5. Temporary milk storage apparatus for use in a milking system having vacuum means which communicates with milk withdrawing means through said apparatus, comprising: a chamber having a volumetric capacity no less than the amount of milk delivered by a cow at a milking, said chamber having means defining a milk receiving passageway connecting it with the milk withdrawing means, means defining a suction passageway above the top level of milk in the chamber, and means defining a milk discharge passageway in its bottom section; means for determining the weight of milk contained in said chamber at any time; and valve means for controlling flow of milk in and out of said chamber, said valve means including a hollow casing having a suction port and a discharge port connected respectively to the suction and discharge passageways and a vacuum port connected to the source of vacuum, and control means selectively movable in the casing between a chamber filling position in which it provides communication between the vacuum port and the suction port and a chamber draining position in which it provides direct communication between the vacuum port and the discharge port, said control means having a venting port which vents the suction port to the atmosphere in chamber draining position.

6. The apparatus of claim 5 in which the venting port in the control member is so positioned that it may be aligned with the discharge port to drain milk directly from the chamber to the atmosphere, and in said position the control member closes the vacuum port and the suction port.

7. The apparatus of claim 5 in which the means for determining the weight of milk in the chamber comprises a transparent sidewall provided with vertically spaced graduations.

8. The apparatus of claim 5 in which the means for determining the weight of milk in the chamber comprises a weighing device on which the chamber is supported.

9. Temporary milk storage apparatus for use in a milking system having vacuum means which communicates with milk withdrawing means through said apparatus, comprising: a chamber having a volumetric capacity no less than the amount of milk delivered by a cow at a milking, said chamber having means defining a milk receiving passageway connecting it with the milk withdrawing means, means defining a suction passageway above the top level of milk in the chamber, and means defining a milk discharge passageway in its bottom section; and valve means which is selectively movable between two positions for controlling the flow of milk into and out of said chamber, said valve means being adapted to provide direct communication between the discharge passageway and the source of vacuum and between the suction passageway and atmosphere in one of said positions and to provide communication between the suction passageway and the source of vacuum and to close off the discharge pasageway in the other of said positions.

10. The apparatus of claim 9 in which the communication between the suction passageway and the atmosphere is provided by a venting port, and the valve means has a third position in which the venting port communicates with the milk discharge passageway to permit withdrawal of milk directly to the atmosphere, the valve means in said third position closing communication with the suction passageway and the vacuum means.

11. Temporary milk storage apparatus for use in a milking system having vacuum means which communicates with milk withdrawing means through said apparatus, comprising: a chamber having a volumetric capacity no less than the amount of milk delivered by a cow at a milking, said chamber comprising a body portion having a straight, cylindrical side wall and top and bottom sections in readily separable fluid tight engagement with the ends of said side wall, and said chamber having means defining a milk receiving passageway connecting it with the milk withdrawing means, means defining a suction passageway above the top level of milk in the chamber, and means defining a milk discharge passageway in its bottom section, and single valve means secured to said milk discharge passageway immediately beneath the bottom section of the chamber, said valve means being selectively movable between two positions for controlling the flow of milk into and out of said chamber, said valve means being adapted to provide direct communication between the discharge passageway and the source of vacuum and between the suction passageway and atmosphere in one of said positions and to provide communication between the suction passageway and the source of vacuum and to close off the discharge passageway in the other of said positions.

12. Temporary milk storage apparatus for use in a milking system having vacuum means which communicates with milk withdrawing means through said apparatus, comprising: a chamber having a volumetric capacity no less than the amount of milk delivered by a cow at a milking, said chamber having a conical bottom; means defining a milk receiving passageway connecting the chamber to the milk withdrawing means; means defining a suction passageway opening into the chamber above the top level of milk therein; means defining a milk discharge passageway extending downwardly from the lowest point of the conical bottom; a float valve adapted to seat on the upper end of the milk discharge passageway;

and valve means which is selectively movable between two positions for controlling the flow of milk into and out of said chamber, said valve means being adapted to provide communication between the discharge passageway and the source of vacuum and between the suction passageway and atmosphere in one of said positions, and to provide communication between the suction passageway and the source of vacuum and to close off the discharge passageway in the other of said positions.

References Cited in the file of this patent

UNITED STATES PATENTS

| Number | Name | Date |
|---|---|---|
| 1,366,664 | Judkins | Jan. 25, 1921 |
| 1,519,827 | Fuge | Dec. 16, 1924 |
| 1,846,805 | Hapgood | Feb. 23, 1932 |
| 1,910,830 | Hapgood | May 23, 1933 |
| 1,972,144 | Hapgood | Sept. 4, 1934 |
| 1,977,511 | Graves | Oct. 16, 1934 |
| 2,009,399 | Hapgood | July 30, 1935 |
| 2,021,591 | Corderoy | Nov. 19, 1935 |
| 2,025,851 | Davis | Dec. 31, 1935 |
| 2,055,531 | Hapgood | Sept. 29, 1936 |
| 2,102,267 | Hodsdon | Dec. 14, 1937 |
| 2,132,334 | West | Oct. 4, 1938 |
| 2,184,678 | Mueller | Dec. 26, 1939 |